Sept. 18, 1945.   C. G. TRIMBACH   2,385,116
AMMUNITION BELT TENSION METER
Filed July 26, 1943
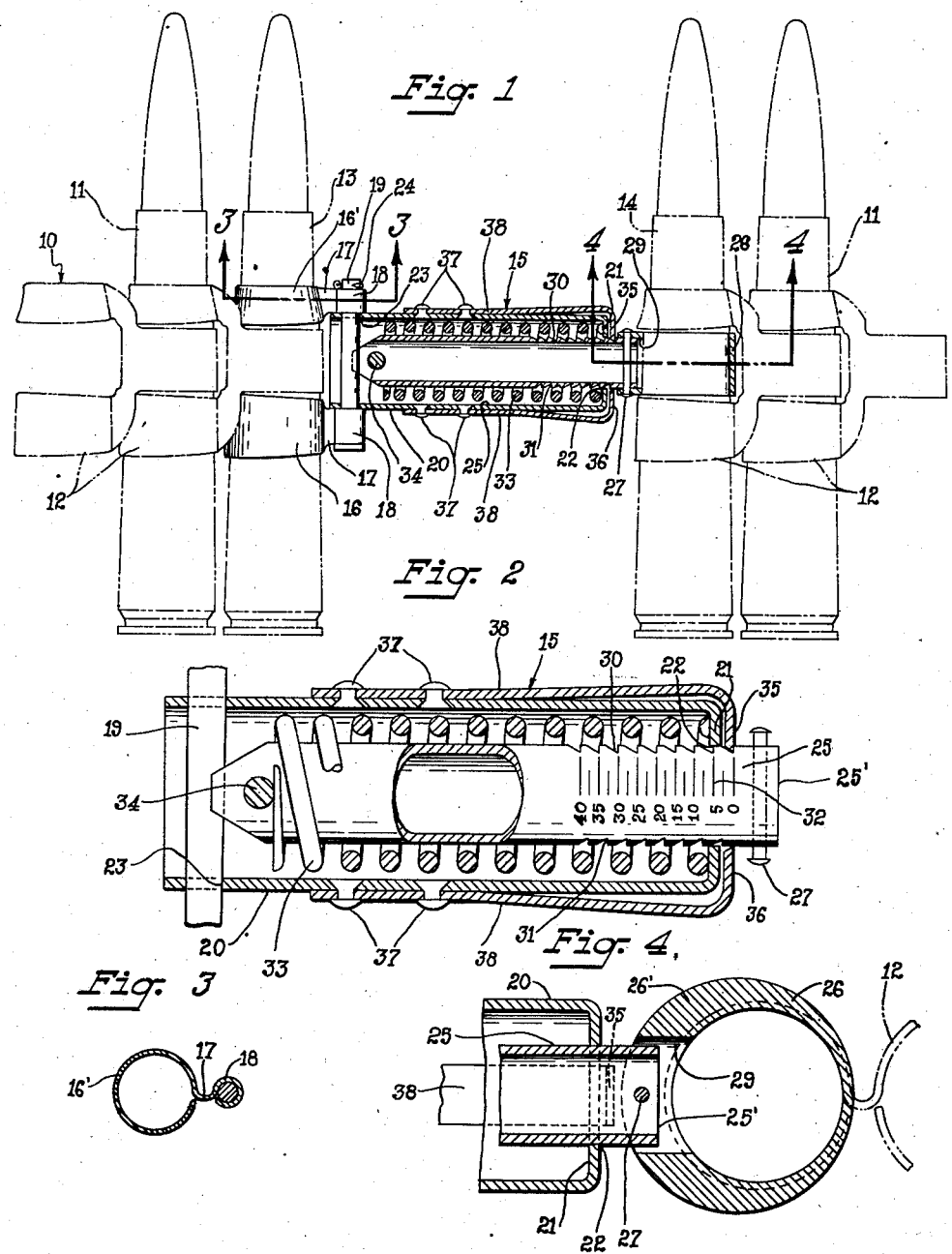
INVENTOR.
CLEM G. TRIMBACH
BY
ATTORNEY Patented Sept. 18, 1945

2,385,116

UNITED STATES PATENT OFFICE 2,385,116

AMMUNITION BELT TENSION METER

Clem G. Trimbach, Eggertsville, N. Y., assignor to Curtiss-Wright Corporation, a corporation of Delaware Application July 26, 1943, Serial No. 496,229

5 Claims. (Cl. 73—167)

This invention relates to tension meters and more particularly to a tension meter which is adaptable for use in measuring the belt loads or pulling force of ammunition belts being fed to automatic guns.

It has been determined that the drag loads of ammunition belts used with automatic guns in airplanes due to flight accelerations are greater than the loads experienced with automatic guns which are mounted in stationary locations, such as ground mounts. Hence, in order to determine what these drag loads may be and to thereby aid in the design of the feeding equipment, a self-recording tension meter which may actually be disposed in the ammunition belt itself, is desirable.

It is therefore an object of the present invention to provide an ammunition belt tension meter which may be linked between adjacent cartridges in the ammunition belt in such a manner that the pull on the belt exerted by firing of the gun in flight is registered and can be read after landing the airplane. The device may be used during ground firing tests also.

It is another object of this invention to provide an ammunition belt tension meter which is simple in construction, accurate in its reading, rugged and movable within the ammunition feed chute to the gun, and one which cannot be affected by dust or sand on frictional surfaces.

According to the present invention, there has been provided a tension meter which has telescoping parts or elements adapted to be respectively connected to adjacent cartridges in an ammunition belt. Between these parts is located a weighing spring to maintain the parts in their telescoped position. On one of the parts there is provided two rows of notches, the notches of one row being staggered with respect to the notches of the other row to give finer increments in recording loads. The other part carries spring pawls adapted to engage the respective sets of notches whereby the parts may be held in extended relationship at intervals along any one row of notches or at fractions of these intervals. On the part having the notches, there is provided certain indicia whereby the extent to which this part is extended can be readily determined or indicated in pounds of drag. When the meter is to be used again, the holding pawls are disengaged by twisting the device in the ammunition belt which disengages the pawls and permits the return to the original telescoped position. To remove the device from the ammunition belt, merely remove the cartridge at each end of the device.

For other objects and for a better understanding of the invention, reference may be had to the following detailed description taken in connection with the accompanying drawing, in which Fig. 1 is a plan view of a portion of an ammunition belt with the tension meter linked between adjacent cartridges thereof, the meter itself being shown in cross section.

Fig. 2 is an enlarged view of the tension meter.

Fig. 3 is a sectional view of an attaching loop taken along the line 3—3 of Fig. 1.

Fig. 4 is an enlarged sectional view of a portion of the tension meter and of its attaching collar as taken along the line 4—4 of Fig. 1.

Referring now to the drawing, there is shown an ammunition belt 10 with cartridges 11, 13, and 14, and links 12. These links 12 as assembled with the cartridges permit the usual flexure of the ammunition belt.

The tension meter 15 is provided with special links consisting of loops 16 and 16' respectively, and a collar 26 which engage cartridges 13 and 14 respectively. Loops 16 and 16' are provided with smaller looped extensions 18 affixed as at 17. A cylinder 20 is provided with a head portion 21, and laterally aligned holes 23 through which the pin 19 extends to attach the cylinder 20 with the small looped extensions 18 of the link loops 16 and 16'. The headed pin 19 is held in place by a cotter pin 24. The cylinder 20 pivots about the pin 19.

Within the cylinder 20 there is an indicia bearing member 25 adapted to telescope through the opening 22 in the head portion 21 of the cylinder 20. The end 25' of the member 25 is connected to the attaching collar 26 by means of pin 27. Referring now to Figs. 2 and 4, it will be noted that the collar 26 is thicker on one side than the other, and that on the thick side 26' there is provided a radially extending oval shaped opening 29 into which the indicia member 25 extends and is fastened by the pin 27, this pin 27 being peened or otherwise permanently secured to the collar 26. Said collar 26 is movably mounted on an adjacent cartridge 14.

On either side of the indicia member 25 there is provided rows of notches 30 and 31, said notches of each row being in staggered relationship with each other. Adjacent these notches is provided certain indicia 32 from which a reading is taken upon the indicia member 25 being drawn through the opening 22 in the head portion 21 of the cylinder 20.

Within the cylinder 20 there is disposed a compression spring 33 adapted to bear against the inner surface of the head portion 21 of the cylinder 20 and against displacement at its opposite end by a pin 34 extending through the indicia member 25. As tension is applied to the ammunition belt 10, the indicia member 25 is extended from the cylinder 20 against the action of the compression spring 33.

In order that a reading may be temporarily recorded of the maximum extent to which the indicia member 25 has been extended, there is provided respectively on opposite sides of the cylinder 20 holding pawls 35 and 36 adapted to register respectively with rows of notches 30 and 31 on the indicia member 25. The free ends of the pawls 35 and 36 are turned radially inwardly about the head portion of the cylinder 20 for engagement with the notches 30 and 31 with the indicia member 25, one holding pawl being engageable with one row of notches while the other holding pawl is out of engagement with the other row. These holding pawls 35 and 36 are fixed to the cylinder 20 by rivets 37 through a longitudinally spring-like extending portion 38 of the pawls. The pawls 35 and 36 will prohibit, upon dropping into the notches, any return movement of the indicia member 25, hence once the tension meter has been extended there is left on the same an indicated record of the movement to which the meter has been extended. In order to reset the meter the pawls 35 and 36 are caused to move outwardly by twisting the telescoped members 20 and 25 so that pawls 35 and 36 are made free of the rows of notches 30 and 31.

It should now be apparent that there has been provided a tension meter which is simple in construction and adaptable to be linked within an ammunition belt. It should also be apparent that there has been provided in such a meter, means whereby a reading of the extent to which the parts thereon have been extended, is positively indicated.

While various changes may be made in the detail construction, it shall be understood that such changes shall be made within the spirit and scope of the present invention as defined by the appended claims.

I claim as my invention:

1. In a tension meter for measuring the pulling forces acting upon an ammunition belt of link construction and wherein the shells carried by the belt are utilized to connect adjacent links, a pair of cooperating parts which are utilized as a belt insert and which are movable with respect to one another in response to said forces, yieldable means which resists relative movement between said parts, link elements carried by said parts, said link elements being adapted to cooperate with the links of said belt so that said shells may also be utilized to detachably connect said parts to spaced-apart portions of said belt, whereby the pulling forces developed by the firing of said shells will extend said parts against the action of said yieldable means, means associated with said parts and responsive to relative movement between them for indicating the magnitude of said forces, and means for releasably holding said parts in the positions to which they are extended so that the indicated magnitudes of said forces may be observed.

2. In a tension meter for measuring the pulling forces acting upon an ammunition belt, a pair of cooperating parts which are utilized as a belt insert and which are movable lengthwise with respect to one another in response to said forces, yieldable means which resists relative movement between said parts, means for detachably connecting said parts to spaced-apart portions of said belt, whereby the pulling forces developed by the firing of the shells carried by said belt will extend said parts against the action of said yieldable means, means associated with said parts and responsive to relative movement between them for indicating the magnitude of said forces, and means for releasably holding said parts in the positions to which they are extended so that the indicated magnitudes of said pulling forces may be observed, one of said parts being rotatable about its longitudinal axis with respect to the cooperating part to effect the release of said last mentioned means.

3. In a tension meter for measuring the pulling forces acting upon an ammunition belt of link construction and wherein the shells carried by the belt are utilized to connect adjacent links, a pair of cooperating parts which are utilized as a belt insert and which are movable lengthwise with respect to one another in response to variations in said forces, yieldable means which resists relative movement between said parts, link elements carried by said parts, said link elements being adapted to cooperate with the links of said belt so that said shells may also be utilized to detachably connect said parts to spaced-apart portions of said belt, whereby the pulling forces developed by the firing of the said shells will extend said parts against the action of said yieldable means, means associated with said parts and responsive to relative movement between them for indicating the magnitude of said forces, and means for releasably holding said parts in the positions to which they are extended so that the indicated magnitudes of said forces may be observed, one of said parts being rotatable about its longitudinal axis with respect to the companion part to effect the release of said last mentioned means.

4. In a tension meter for measuring the pulling forces acting upon an ammunition belt, a tubular body, an element in said body, means for detachably connecting said body and element to spaced-apart portions of said belt, whereby said body and element are movable with respect to one another in response to said pulling forces, resilient means which resists such relative movement between said parts, means associated with said body and element and responsive to relative movement between them for indicating the magnitude of said forces, a series of notches formed in said element, and a catch carried by said body and engageable with said notches to releasably hold said parts in the positions to which they are extended so that the indicated magnitudes of said pulling forces may be observed, said body being rotatable about its longitudinal axis relative to said element to effect the release of said catch.

5. In a tension meter for measuring the pulling forces acting upon an ammunition belt of link construction and wherein the shells carried by the belt are utilized to connect adjacent links, a tubular body, an element in said body, yieldable means for holding said body and element in unextended positions, link elements carried by said body and element and cooperable with the links of said belt so that said shells may also be utilized to detachably connect said parts to spaced-apart portions of said belt, whereby the pulling forces developed by the firing of said shells will extend said parts against the action of said yieldable means, means associated with said body and element and responsive to relative movement between them for indicating the magnitudes of said forces, a series of notches formed in said element, and a catch carried by said body and engageable with said notches to releasably hold said parts in the positions to which they are extended so that the indicated magnitudes of said forces may be observed, said body being rotatable about its longitudinal axis relative to said element to effect the release of said catch.

CLEM G. TRIMBACH.